(12) United States Patent  
Smulson

(10) Patent No.: US 7,008,500 B2  
(45) Date of Patent: Mar. 7, 2006

(54) HIGH PRESSURE LAMINATION OF ELECTRONIC CARDS

(75) Inventor: Joel Smulson, Calabasas, CA (US)

(73) Assignee: Soundcraft, Inc., Chatsworth, CA (US)

( * ) Notice: Subject to any disclaimer, the term of this patent is extended or adjusted under 35 U.S.C. 154(b) by 678 days.

(21) Appl. No.: 11/071,629

(22) Filed: Jul. 5, 2002

(65) Prior Publication Data

US 2005/0252604 A1 Nov. 17, 2005

Related U.S. Application Data

(62) Division of application No. 09/900,322, filed on Jul. 5, 2001, now Pat. No. 6,586,078.

(51) Int. Cl.  
 B32B 31/12 (2006.01)  
 B32B 31/18 (2006.01)  
 B32B 31/20 (2006.01)

(52) U.S. Cl. ............... 156/252; 156/256; 156/267; 156/308.2

(58) Field of Classification Search ............ 156/252, 156/253  
See application file for complete search history.

(56) References Cited

U.S. PATENT DOCUMENTS

| | | | | |
|---|---|---|---|---|
| 3,913,219 A | * | 10/1975 | Lichtblau | 29/592 |
| 4,311,749 A | * | 1/1982 | Hiraiwa et al. | 428/209 |
| 4,539,472 A | * | 9/1985 | Poetker et al. | 235/488 |
| 4,863,546 A | * | 9/1989 | Melzer et al. | 156/308.2 |
| 5,387,306 A | * | 2/1995 | Jarvis | 156/292 |
| 5,583,320 A | * | 12/1996 | Eriguchi et al. | 174/254 |
| 5,659,153 A | * | 8/1997 | Narayan et al. | 174/255 |
| 5,690,773 A | * | 11/1997 | Fidalgo et al. | 156/267 |
| 5,741,392 A | * | 4/1998 | Droz | 156/295 |
| 5,804,026 A | * | 9/1998 | Vogt | 156/295 |
| 5,879,502 A | * | 3/1999 | Gustafson | 156/292 |
| 6,203,655 B1 | * | 3/2001 | Fujikawa et al. | 156/272.8 |
| 6,207,004 B1 | * | 3/2001 | Murasawa | 156/300 |

(Continued)

FOREIGN PATENT DOCUMENTS

| FR | 2 803 412 | * | 7/2001 |
|---|---|---|---|
| JP | 11-034547 | * | 2/1999 |

(Continued)

*Primary Examiner*—Melvin Mayes  
(74) *Attorney, Agent, or Firm*—Law Offices of Natan Epstein

(57) ABSTRACT

Plastic cards with included electronic elements are made by laminating a carrier sheet bearing multiple electronic elements between top and bottom plastic sheets. The laminated composite is die cut into separate cards. Prior to lamination the carrier sheet is perforated in a web pattern such that the carrier sheet material is largely recessed from the side edges of the finished cards for better lamination and appearance of the finished card edges. The electronic elements may be obtained on continuous rolls of carrier material which is cut into sheets for lamination.

13 Claims, 3 Drawing Sheets

U.S. PATENT DOCUMENTS

| | | | |
|---|---|---|---|
| 6,248,199 B1 * | 6/2001 | Smulson | 156/244.12 |
| 6,305,609 B1 * | 10/2001 | Melzer et al. | 235/487 |
| 6,305,780 B1 * | 10/2001 | Askren et al. | 347/37 |
| 6,375,780 B1 * | 4/2002 | Tuttle et al. | 156/226 |
| 6,514,367 B1 * | 2/2003 | Leighton | 156/153 |
| 6,551,449 B1 * | 4/2003 | Fujikawa et al. | 156/380.9 |
| 6,586,078 B1 * | 7/2003 | Smulson | 428/192 |
| 6,630,370 B1 * | 10/2003 | Kasahara et al. | 438/118 |
| 6,649,014 B1 * | 11/2003 | Wada | 156/286 |
| 6,926,794 B1 * | 8/2005 | Kohama et al. | 156/308.2 |
| 2003/0037875 A1 * | 2/2003 | Kohama et al. | 156/309.6 |
| 2003/0064544 A1 * | 4/2003 | Heinemann et al. | 438/106 |
| 2004/0259291 A1 * | 12/2004 | Takiar | 438/113 |

FOREIGN PATENT DOCUMENTS

| | | | |
|---|---|---|---|
| JP | 11-034549 | * | 2/1999 |
| JP | 11-139050 | * | 5/1999 |
| JP | 11-314479 | * | 11/1999 |
| WO | 97/03466 | * | 1/1997 |
| WO | 99/24934 | * | 5/1999 |

* cited by examiner

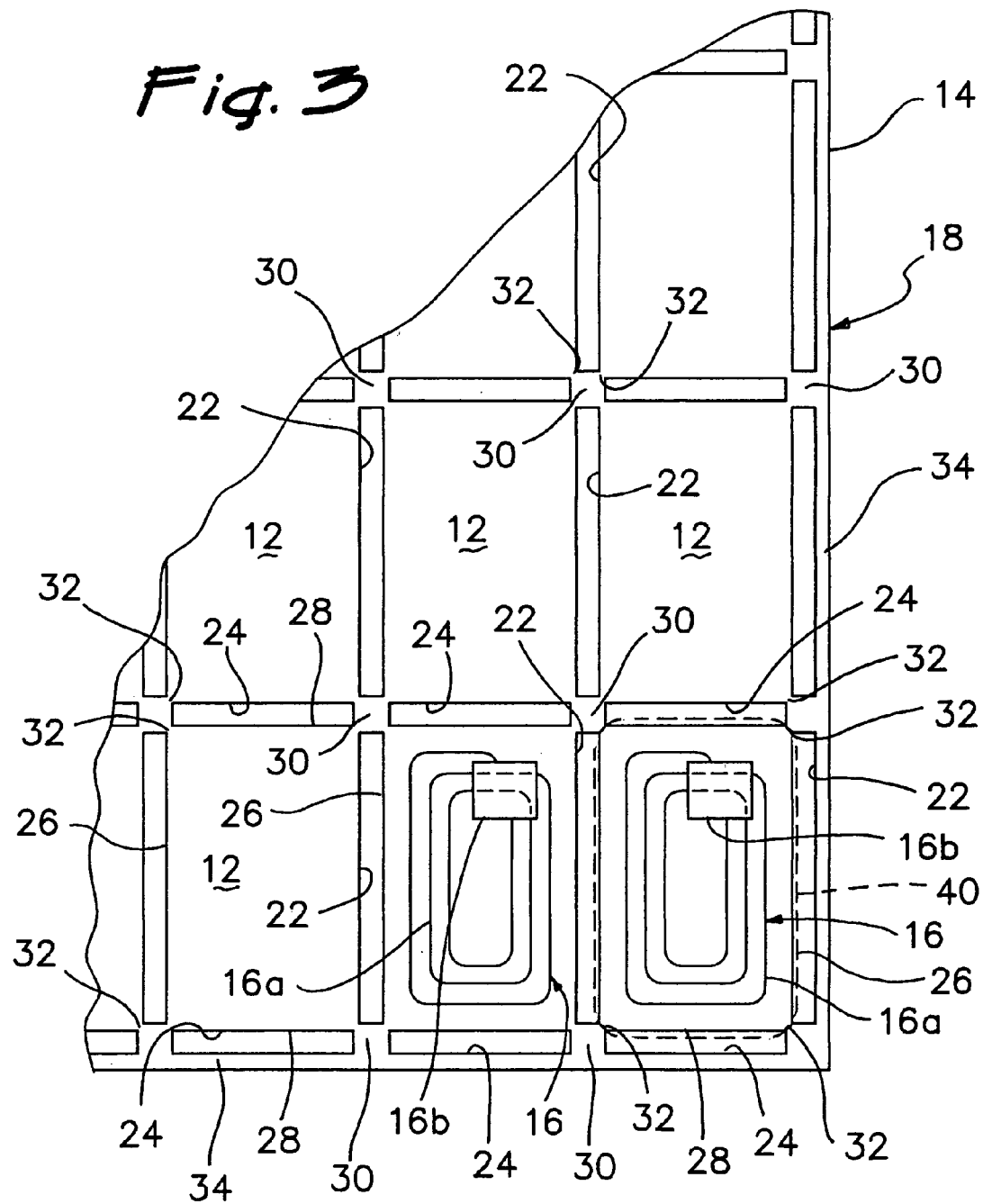

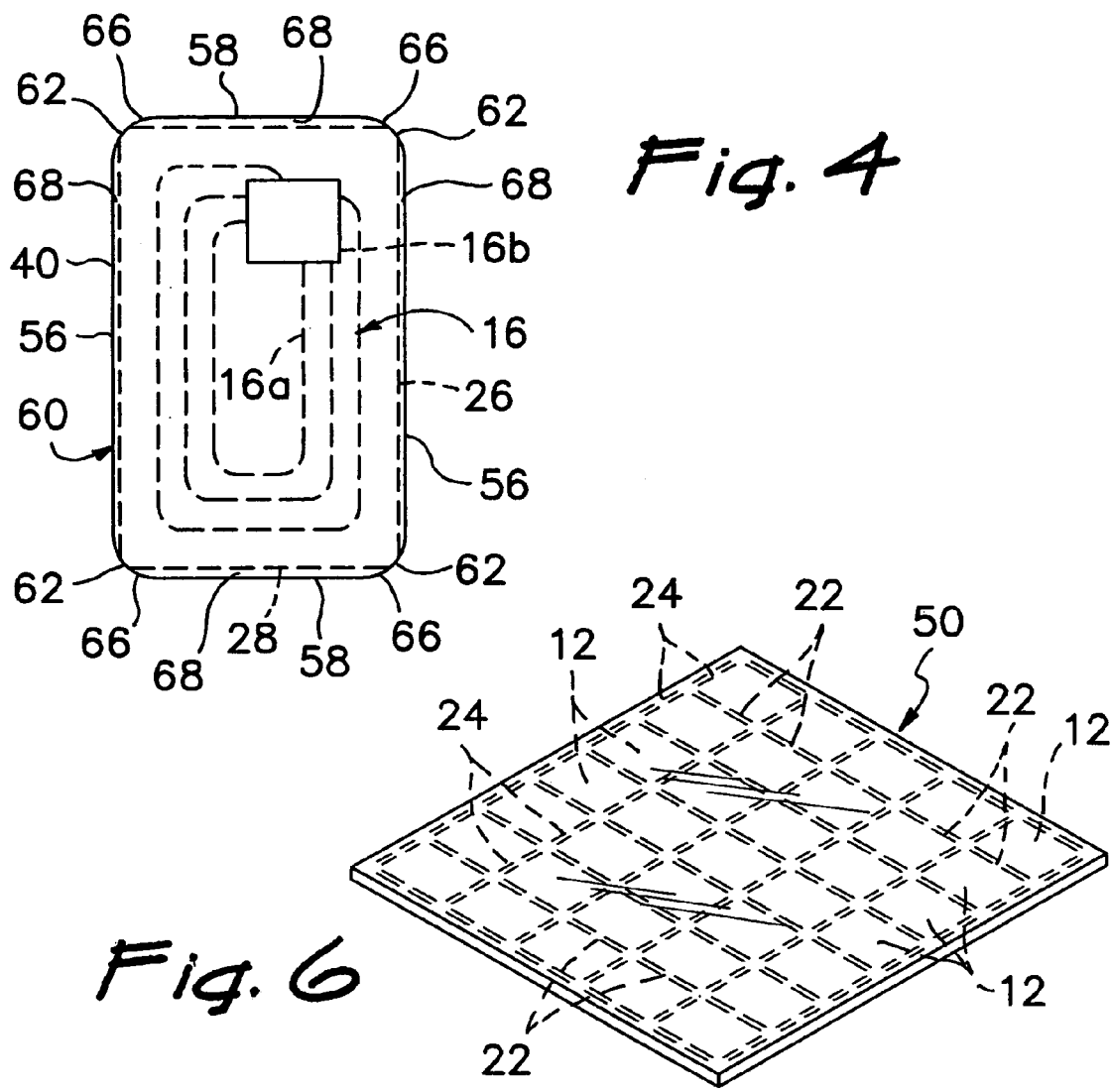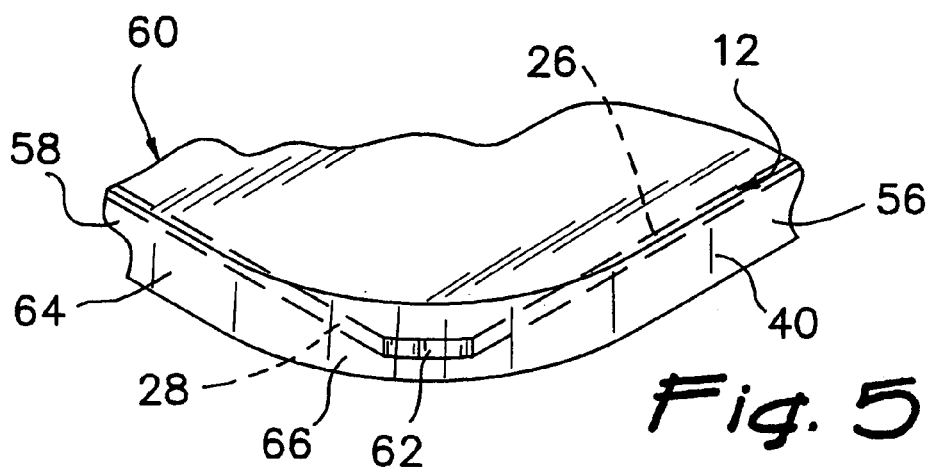

HIGH PRESSURE LAMINATION OF ELECTRONIC CARDS

This application is a Divisional of application Ser. No. 09/900,322, filed Jul. 5, 2001, now U.S. Pat. No. 6,586,078.

BACKGROUND OF THE INVENTION

1. Field of the Invention

This invention is directed to a method for making laminated plastic cards which incorporate electronic elements such as integrated circuit microchips.

2. Background of the Invention

Laminated electronic cards are widely used in the radio-frequency identification (RFID) field for applications which include remotely readable electronic key cards and identification cards. Each electronic card may contain a radio-frequency transponder system which typically includes a transponder microchip with associated elements such as tuning capacitors and a radio-frequency antenna. The electronic components of the card are contained between two or more sheets of plastic laminated to each other by application of heat and pressure to top and bottom exterior surfaces of the card assembly.

In existing card lamination processes the electronic components are supplied to the card manufacturer on a continuous roll of polyester which may be 2 inches wide by 1000 feet in length, with the electronic circuits spaced along the roll at, e.g. two inch intervals. Each electronic circuit may include a radio-frequency antenna circuit printed on the polyester sheet, an integrated circuit such as a flip chip integrated circuit electrically connected to the antenna, and any other components such as a tuning capacitor that may be required for the operation of the particular circuit. The electronic circuit as supplied on the roll is complete and ready for insertion into a card.

This is accomplished by punching out from the roll portions of polyester sheet carrying each electronic circuit to obtain an inlay or insert which are picked up and placed one-by-one by a robotic device onto a blank first sheet of plastic. The individual inlays are held in place on this blank sheet by means of a pre-applied adhesive or by laser welding. The electronic circuit inlays are then covered with a second sheet of plastic placed over the first sheet of plastic. These two sheets of plastic range between 2 and 10 mils in thickness and together make up the core of the laminated cards. Additional sheets may be placed over the first and second sheets, for example, graphics layers and protective clear overlays. The multiple sheets are then laminated to each other by application of sufficient heat and pressure to cause partial fusion of the contacting surfaces of the adjacent sheets. The first and second plastic sheets are typically of vinyl which is not compatible with the polyethylene carrier sheet of the electronic circuit inlay. That is, the vinyl does not make a dependable lamination bond with the polyethylene. For this reason, the polyethylene sheet is limited to an interior portion of the card, leaving a sufficient border around the inlay, e.g. a $\frac{1}{8}^{th}$ or $\frac{1}{4}$ inch *width*, of the first and second sheets of vinyl to bond to each other around the electronics *inlay*.

The process just described is cumbersome because of the number of operations involved, including separation of the electronics inlays from the supply roll, transferring each inlay to the plastic sheet and fastening the inlay to the plastic sheet.

In applicant's prior application Ser. No. 09/299,944, now U.S. Pat. No. 6,248,199, a method for the continuous extrusion of electronic cards with inlaid electronic circuits or devices was disclosed. While continuous extrusion addresses some of the shortcomings of the prior art, it requires specialized extrusion equipment.

A simpler and faster method of making electronic cards is still needed which makes use of machinery and processes familiar to the industry such as lamination processes and equipment.

SUMMARY OF THE INVENTION

This invention addresses the aforementioned shortcomings, and provides a method for large volume production of laminated cards containing electronic elements. The novel method includes the steps of providing a number of electronic circuits supported on a carrier sheet; perforating the carrier sheet to define a carrier web having a number of carrier cards wherein each carrier card supports at least one of the electronic circuits. Each carrier card has a number of carrier card edges and each carrier card is connected to one or more adjacent carrier cards by one or more links each having a link width small in relation to the total length of the carrier card edges. The carrier web with the electronic circuits is interposed between a top sheet and a bottom sheet of plastic material; applying heat and pressure to the top sheet and the bottom sheet sufficient to bond the top and bottom sheets to each other into a laminate sheet containing the carrier web and the electronic circuits. The laminate sheet is cut so as to define a number of laminate cards, each laminate card having a number of laminate card edges and containing between the laminate card edges at least one carrier card; the laminate card edges overlapping the carrier card edges such that the carrier card edges are hidden within the laminate card whereby exposure of the carrier card along the laminate card edges is substantially limited to the width of the links thereby to provide for adhesion between the top sheet and the bottom sheet along the laminate card edges.

The carrier sheet may be made by cutting a length of a continuous carrier roll, the carrier roll being pre-loaded with the electronic circuits such that the circuits are arranged in an n by m matrix on each carrier sheet. The electronic circuits may each include or consist of, for example, a radio frequency antenna connected to a radio frequency transponder integrated circuit.

The carrier sheet may be of polyethylene and the top sheet and the bottom sheet may be of vinyl. The exposed link edges may be located at one or more corners of the finished laminate card. For example, each carrier card may have four links located which result in exposed link edges at four card corners of the laminate card.

The method according to this invention may further include the step of placing a graphics sheet over one or both of the top sheet and the bottom sheet prior to the step of applying heat and pressure, such that the resulting laminate sheet also includes the graphic sheet to provide graphics visible on one or both of sides of the finished laminate card. It may also be desirable to apply a clear overlay sheet over the graphics sheet prior to the step of applying heat and pressure such that the overlay sheet is also included in the laminate sheet and the graphics layers on each finished laminate card are protected against wear during subsequent use of the laminate card.

In addition to the novel method just summarized, this invention also includes a laminated electronic card having first and second sheets of similar thermoplastic material such as vinyl, an intermediate carrier sheet of a different thermoplastic material substantially incompatible with lamination to vinyl, such as polyethylene, and an electronic circuit on the carrier sheet between the first and second plastic sheets, the first and second sheets being bonded to each other along a card edge, the carrier sheet being exposed only along relatively small segments of the laminated card edge thereby to minimize likelihood of delamination of the first and second sheets along the laminated card edge. In one form of the laminated electronic card of this invention the carrier sheet is exposed only along corner portions of the card edges, and the small segments are each no more than about one quarter inch in length along the card edge. The electronic circuit contained between the first and second sheets may include or consist of a radio frequency antenna, for example an antenna circuit printed on the carrier sheet, connected to a radio frequency transponder integrated circuit. The laminated electronic card may also include a graphics sheet laminated to exterior surfaces of one or both of the first and second sheets, and a clear overlay sheet applied over the graphics sheet to protect the graphics sheet against wear during use of the card.

The finished laminated card obtained by the process of this invention resembles the electronic cards obtained by the previously disclosed continuous extrusion process of the related application Ser. No. 09/299,944, now U.S. Pat. No. 6,248,199, in that the edges of the finished card are of uniform material along the card edges except for short exposed sections of a layer of different material used as a carrier layer for the inlaid electronic circuit, and to this extent, the prior disclosure is incorporated herein.

These and other improvements, features and advantages of the method and the card of this invention will be better understood from the following detailed description and accompanying drawings.

BRIEF DESCRIPTION OF THE DRAWINGS

FIG. 3 shows in plan view a portion of the carrier web sheet of FIG. 2 and suggests in dotted lining the edge of a single finished laminated card in relation to the carrier card edge to show the border defined between the two edges; and FIG. 4 is a plan view of a finished laminated electronic card suggesting in phantom lining the electronic circuit and the edge of the carrier card contained in the finished laminated card.

FIG. 5 is a fragmentary view showing in side elevation the thickness of one corner of the finished laminated card of FIG. 4 to illustrate the limited bleed-through of the carrier card sheet material along the edge of the finished laminated card.

FIG. 6 is a perspective view of a laminate sheet containing a matrix of carrier cards prior to separation into finished laminated cards.

DETAILED DESCRIPTION OF THE PREFERRED EMBODIMENTS

Figure 1:
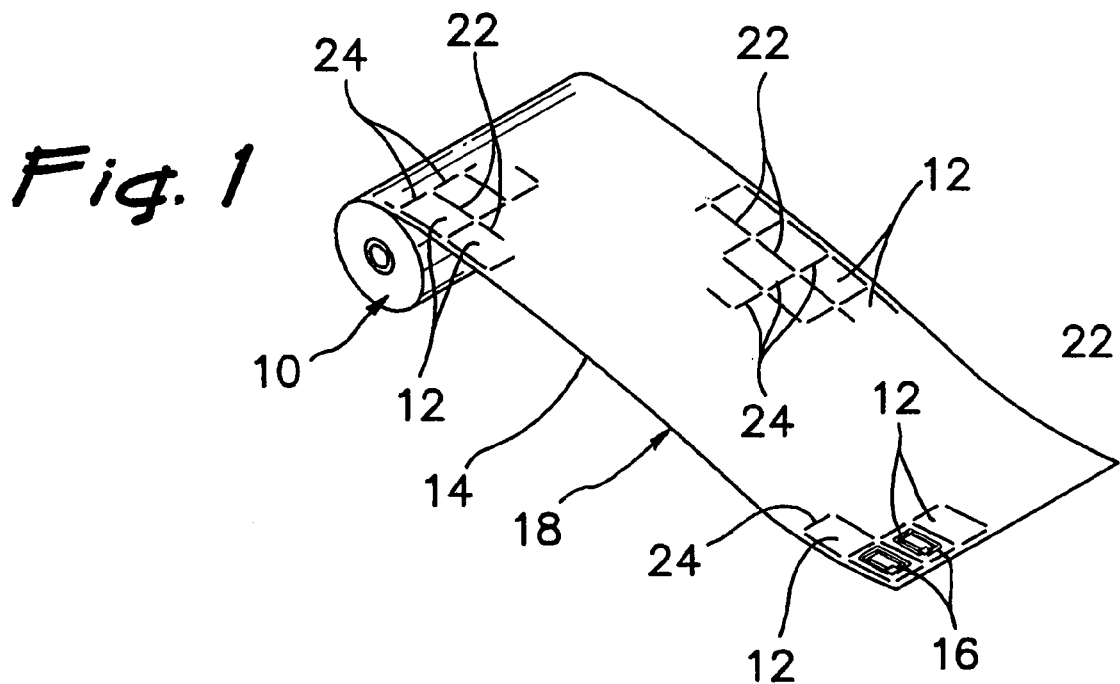
FIG. 1 illustrates in perspective view a typical supply roll of carrier sheet material pre-cut and perforated to define a continuous carrier web made-up of a rectangular grid of carrier cards interconnected by small links, each carrier card carrying an electronic circuit for insertion into a laminated card.

With reference to the accompanying drawings wherein like elements are designated by like numerals, FIG. 1 illustrates a supply roll 10 of continuous carrier sheet material 14. It is conventional for electronic components of many types to be supplied on large continuous roll of carrier sheet material such as polyethylene. The supply rolls facilitate automated handling of the electronic components by robotic pick and place machines which remove individual electronic elements from the roll for mounting on circuit boards or the like on an assembly line. Conventionally, the supply roll has a width such as 2 inches, sufficient to accommodate a single component or only as many components as are required in a single pick and place operation of the robotic mechanism fed by the roll.

For purposes of this invention, however, the supply roll 10 is made wider, for example 12 inches wide, so as to accommodate a number of electronic devices 16, for example seven electronic devices 16 across the width of the roll in FIG. 1. The roll 10 may be 1,000 feet long, with perhaps several thousand electronic devices 16 spaced along the length of the roll. The material of carrier sheet 14 is selected for its mechanical and electrical properties and may serve as a substrate for electrically conductive printed circuit traces interconnecting individual components of electronic circuits 16.

The carrier sheet 14 of roll 10 is cut and perforated as in a die cutting operation to make a continuous carrier web 18. The carrier web 18 is perforated by parallel rows of successive longitudinal slots 22 and by parallel rows of successive transverse slots 24. The slots 22, 24 define a rectangular array of carrier cards 12 where each carrier card 12 is partially separated from adjacent carrier cards 12 by two longitudinal slots 22 and two transverse slots 24. In a presently preferred form of the invention, the supply roll 10 is pre-punched with slots 22, 24 as provided by the vendor of the electronic devices 16 to the card laminating facility, to reduce the number of steps to be performed at the laminating facility.

Each carrier card 12 of the web 18 carries one electronic circuit 16, where each device 16 includes a printed antenna circuit 16a connected to a transponder microchip 16b, as shown in FIG. 3. The carrier cards 12 and corresponding circuits 16 are arranged in a matrix of transverse rows and longitudinal columns along the width and length of the carrier roll 10. The electronic circuit 16 is shown only by way of example and this method is equally useful for making electronic cards containing a variety of active or passive electronic circuits. The term circuit is used broadly to include not only interconnected circuit elements but also single electric, electronic or magnetic elements such as Wiegand wires or resonant wire elements and others that are now used or that may come into use in the field.

The longitudinal slots 22 define longer side edges 26 of the carrier cards and transverse slots 24 define shorter end edges 28 of the carrier cards 12. Each of the slots 22, 24 terminate short of intersecting each other to define generally rectangular bridge areas 30 connected by small links 32 to the corners of adjacent carrier cards 12 or to a web edge strip 34. Each link 32 is of narrow width which need be no more than necessary to provide a sufficient mechanical connection between the carrier cards 12 to withstand handling and maintain integrity of the carrier web 18 during the various steps of the card laminating process described herein.

Figure 2:
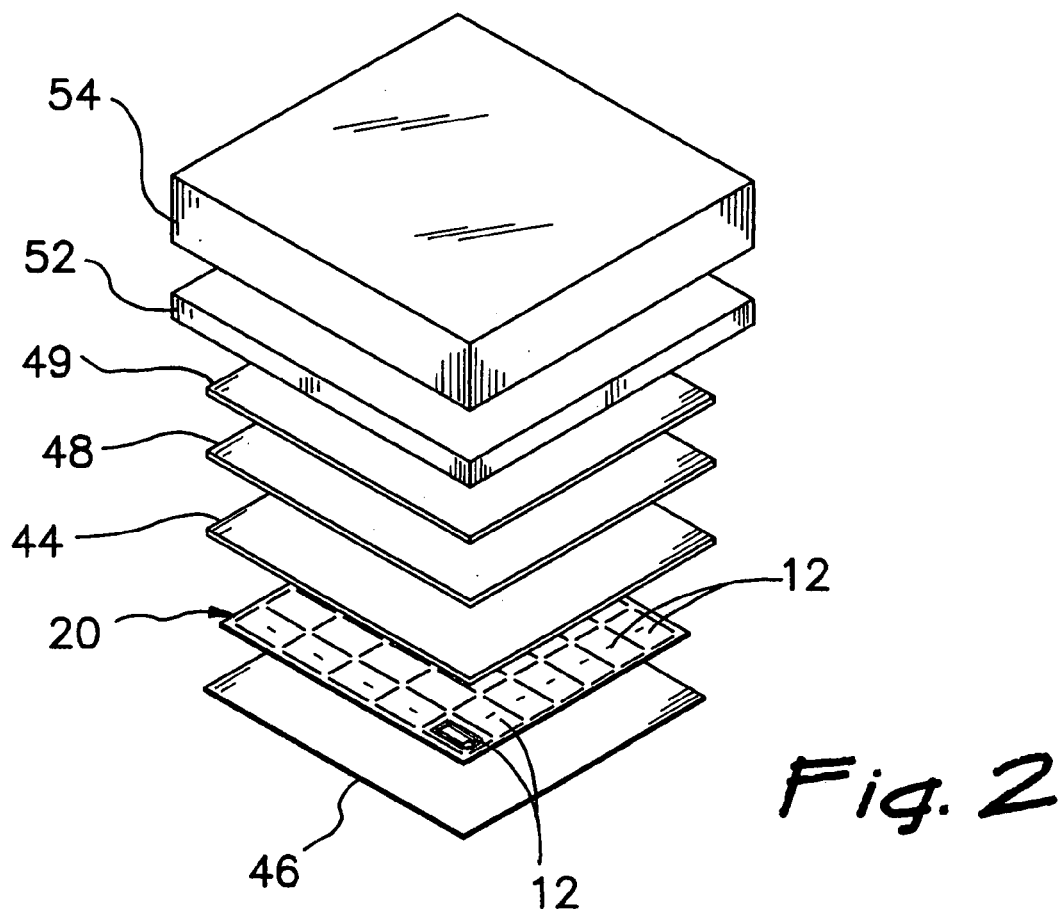
FIG. 2 is an exploded perspective view of a stack including a carrier web sheet cut from the continuous roll of FIG. 1 and interposed between upper and lower sheets of plastic, these being overlaid with a graphics sheet and a clear overlay sheet, all positioned between metal plates of a laminating press for making a laminated sheet ready for cutting into individual laminated cards.

The continuous 12 inch wide carrier web 18 is cut into shorter lengths, such as 12 inch lengths, each of which constitutes a 12 inch by 12 inch web sheet 20 comprising an n by m matrix of carrier cards 12. The specific dimensions of the matrix are typically determined by the capacity of the high pressure laminating press used in this process. By way of example, FIG. 2 shows a web sheet 20 having a 5 by 7 matrix of carrier cards 12. The web sheet 20 is placed between a top sheet 44 of plastic and a bottom sheet 46 of plastic. The plastic material of sheets 44, 46, such as vinyl, is selected as suitable for lamination to each other by application of heat and pressure. The two vinyl sheets when laminated to each other form a vinyl core containing the electronic circuit inlay of the finished card. Optionally, additional sheets such as a graphics layer 48 and a protective clear overlay sheet 49 may be laid onto the exterior surface of one or both of the top sheet 44 and bottom sheet 46. The graphic and overlay sheet materials, if any, are selected for good lamination compatibility with the top and bottom sheets 44, 46. The choice of sheet materials for these purposes is well understood in the plastic card industry and does not require explanation here. The combined lay-up of the various sheets is placed between metal platens 52 which impress a desired surface finish to the exterior plastic surfaces of the laminated card. Finally, heat and pressure is applied to the lay-up by top and bottom heated pressure plates 54 of a laminating press (only the top platen 52 and top pressure plate 54 are shown for clarity of illustration). The choice and operation of a suitable laminating press is well understood in the art and need not be discussed in greater detail here. Laminating presses such as are presently used in the conventional card lamination processes described in the introductory portion of this specification may be used for the method of this invention as well.

Upon application of laminating heat and pressure, the top sheet 44 and bottom sheet 46 come into contact and fuse with each other within the apertures of slots 22, 24 to make a laminate sheet 50 such as shown in FIG. 6 and which incorporates the entire carrier web sheet 20 with the 5 by 7 matrix of carrier cards 12 along with the electronic circuits 16 on the carrier cards. The laminate sheet 50 is then cut and punched as in a punch die to cut out in one operation the finished laminated electronic cards 60. In the illustrated example a total of 5×7 or 35 separate finished laminated cards 60 are punched out. Each laminated card 60 is punched out along a laminated card edge 40 which encompasses the edges 26, 28 of a corresponding inlaid carrier card 12 as already explained in connection with FIG. 3. This punching operation also severs the links 32 which connect the corners of the carrier card to the respective bridge areas 30. The links 32 are the only portions of the carrier card layer 14 that extend beyond the dotted line of the laminated card edge 40 in FIG. 3. For this reason, exposure of the carrier card layer along the edge of the finished laminated card is limited to the width of the links 32 along the laminated card edge 40. As shown in FIGS. 4 and 5 this "bleed through" of the carrier sheet link edges is limited to four small segments 62 located at each of the four corners 66 of the laminated card 60, for example, a few thousands of an inch in width at the point where each link 32 is cut by the edge 40 of the laminated card.

It should be noted that this punching operation of the laminate sheet 50 is analogous to a punching operation performed in conventional methods of high pressure lamination of electronic cards mentioned in earlier portions of this disclosure, except that in the prior art process the laminate sheet contains individual electronic circuit inlays which were punched out of the supply roll and individually positioned and secured in place on one plastic sheet which is then laminated with a cover sheet. In the method of this disclosure, a number of electronic circuits 16 limited only by the size of the laminating press are instead simultaneously positioned and secured to the plastic sheet as a single unit, that is, as one web sheet 20 carrying all of the circuits pre-positioned on the web sheet in correct relationship for inlaying into a similar number of laminated cards 60 to be punched out of the laminate sheet 50 containing the web sheet 20.

The laminated card edge 40 includes two laminated card side edges 56 and two laminated card end edges 58 which are outwardly displaced in relation to carrier card side edges 26 and carrier card end edges 28, respectively. Between the laminate card edges and the carrier card edges are defined four laminated borders 68, best appreciated in FIG. 4. The laminated borders 68 hide most of the edges 26, 28 of the inlaid carrier card 12 for better card aesthetics and, more importantly, allow positive lamination of compatible materials, such as vinyl sheets 46, 48, continuously along the card edge 40 except for the lengths of the small exposed edge segments 62 of the links 32 of the carrier card 12. FIG. 5 depicts in perspective view a portion of the edge surface 64 along one such corner 66 to illustrate the short length of the exposed edge 62 of carrier sheet material along the edge 40 of the card at each corner. The edge surface 64 of the finished laminated card 50 is consequently largely free of an intervening layer of incompatible carrier sheet material which, if present, would facilitate delamination of the top and bottom sheets 44, 46 during use and handling of the card. The exposure of the carrier sheet material is limited to edge segments 62 which are very small, as small as a few thousands of an inch in width along edge 40, in relation to the overall length of card edge 40, thereby providing a finished card edge surface 64 which is resistant to delamination.

Although the preceding description has included a continuous supply roll 10 of carrier sheet material 14, this invention also contemplates the use of electronic circuits supplied to the card manufacturer on precut carrier sheets such as carrier sheet 20 in FIG. 2 in lieu of a continuous supply roll 10. Also, the method disclosed herein is not limited to any particular arrangement of the electronic circuits 16 on the carrier sheet material 14, nor to a particular size or shape of either the carrier cards 12 or the finished laminated cards 50. Furthermore, the exposed link edges 62 may be located at any point along the card edge 40, and a greater or lesser number of such links 32 may be employed, provided that the combined length of the exposed link edges 62 remains relatively small in relation to the overall length of the card edge 40.

It will be appreciated from the foregoing that this method of making laminated electronic cards represents a significant advance and improvement in that the steps of separating individual electronic circuits from a continuous supply roll and then individually attaching the separated circuits to a plastic sheet are eliminated. As a result, costly pick-and-place machinery and maintenance of the same is no longer required for making laminated cards by the method of this invention.

While a presently preferred embodiment of the invention has been disclosed for purposes of clarity and explanation, it will be understood that many changes, substitutions and modifications will be apparent to those having no more than ordinary skill in the art without thereby departing from the scope of the invention as defined in the following claims.

What is claimed is:

1. A method for making laminated cards containing electronic elements, comprising the steps of:
    providing a plurality of electronic circuits supported on a carrier sheet in an n by m matrix wherein both n and m are greater than one;
    perforating said carrier sheet so as to define a carrier web including a plurality of carrier cards wherein each carrier card supports at least one of said electronic circuits, each carrier card having a plurality of carrier card edges and each carrier card being connected to one or more adjacent carrier cards by one or more links each having a link width small in relation to the total length of said carrier card edges
    interposing said carrier web with said electronic circuits between a top sheet and a bottom sheet of initially solid thermoplastic material;
    applying heat and pressure to said top sheet and said bottom sheet sufficient to form a laminate sheet containing said web and said electronic circuits;
    cutting said laminate sheet so as to define an n by m plurality of laminate cards, each laminate card having a plurality of laminate card edges and containing between said laminate card edges at least one said carrier card;
    said carrier card edges being recessed from said laminate card edges to define border areas of contact between said top sheet and said bottom sheet such that said carrier card edges are hidden within said laminate card whereby exposure of said carrier card along said laminate card edges is substantially limited to the width of said links thereby to provide for adhesion between said top sheet and said bottom sheet along said laminate card edges.

2. The method of claim 1 wherein said carrier sheet is made by cutting a length of a continuous carrier roll.

3. The method of claim 1 wherein said step of cutting is performed by die cutting said laminate sheet in a single cutting operation thereby to substantially simultaneously define said plurality of laminate cards.

4. The method of claim 1 wherein said electronic circuits each comprise a radio frequency antenna connected to a radio frequency transponder integrated circuit.

5. The method of claim 1 wherein said carrier sheet is of polyester and said top sheet and said bottom sheet are of vinyl.

6. The method of claim 1 wherein said links are located at card corners defined by said laminate card edges.

7. The method of claim 1 wherein said carrier card has four said links located at four card corners of said laminate card.

8. The method of claim 1 wherein said border areas are at least $1/8^{th}$ of an inch in width.

9. The method of claim 1 further comprising the step of placing a graphics sheet over one or both of said top sheet and said bottom sheet prior to said step of applying heat and pressure, whereby said laminate sheet includes said graphic sheet and each said laminate card has graphics visible on one or both sides of the laminate card.

10. The method of claim 9 further comprising the step of placing a clear overlay sheet over said graphics sheet prior to said step of applying heat and pressure whereby said overlay sheet is included in said laminate sheet and said graphics on each said laminate card are protected against wear during use of the laminate card.

11. A method for high volume production of laminated cards containing electronic elements, comprising the steps of:
    providing a continuous roll of carrier sheet with electronic elements supported thereon in a regular pattern;
    cutting off a length of said carrier sheet from said roll to make a carrier sheet;
    perforating said carrier sheet so as to define a carrier web including a plurality of carrier cards in an n by m matrix wherein both n and m are greater than one and wherein each carrier card supports at least one of said electronic elements, each carrier card having a plurality of carrier card edges and each carrier card being connected to one or more adjacent carrier cards by one or more links each having a link width small in relation to the total length of said carrier card edges;
    interposing said carrier web with said electronic elements between a top sheet and a bottom sheet of initially solid thermoplastic;
    applying heat and pressure to said top sheet and said bottom sheet sufficient to form a laminate sheet containing said web and said electronic devices;
    cutting said laminate sheet so as to define an n by m plurality of laminate cards, each laminate card having a plurality of laminate card edges and containing between said laminate card edges at least one said carrier card;
    said laminate card edges overlapping said carrier card edges such that said carrier card edges are hidden within said laminate card whereby exposure of said carrier card along said laminate card edges is substantially limited to the width of said links thereby to provide for adhesion between said top sheet and said bottom sheet along said laminate card edges.

12. The method of claim 11 further comprising the step of placing a graphics sheet over one or both of said top sheet and said bottom sheet prior to said step of applying heat and pressure, whereby said laminate sheet includes said graphic sheet and each said laminate card has graphics visible on one or both sides of the laminate card.

13. The method of claim 12 further comprising the step of placing a clear overlay sheet over said graphics sheet prior to said step of applying heat and pressure whereby said overlay sheet is included in said laminate sheet and said graphics on each said laminate card are protected against wear during use of the laminate card.

* * * * *